US 6,682,646 B2

(12) United States Patent
Wood et al.

(10) Patent No.: US 6,682,646 B2
(45) Date of Patent: Jan. 27, 2004

(54) ELECTROCHEMICAL PROCESS FOR DECONTAMINATION OF RADIOACTIVE MATERIALS

(75) Inventors: Christopher John Wood, Mountain View, CA (US); David Bradbury, Glos (GB); George Richard Elder, Glos (GB)

(73) Assignee: Electric Power Research Institute, Palo Alto, CA (US)

( * ) Notice: Subject to any disclaimer, the term of this patent is extended or adjusted under 35 U.S.C. 154(b) by 0 days.

(21) Appl. No.: 10/106,481

(22) Filed: Mar. 25, 2002

(65) Prior Publication Data

US 2003/0178308 A1 Sep. 25, 2003

(51) Int. Cl.⁷ .................................................. C02F 1/461
(52) U.S. Cl. ....................................................... 205/742
(58) Field of Search ................................. 205/748, 750, 205/592, 594, 572; 204/252, 632, 536

(56) References Cited

U.S. PATENT DOCUMENTS

| | | | |
|---|---|---|---|
| 3,708,508 A | 1/1973 | Schultz ........................ 252/364 |
| 3,933,605 A | * 1/1976 | Butler et al. ................. 205/592 |
| 4,118,317 A | 10/1978 | Neeb et al. .................... 210/32 |
| 4,512,921 A | 4/1985 | Anstine et al. .............. 252/626 |
| 4,537,666 A | 8/1985 | Murray et al. .......... 204/129.95 |
| 4,705,573 A | 11/1987 | Wood et al. ..................... 134/3 |
| 4,770,783 A | 9/1988 | Gustavsson et al. ......... 210/638 |
| 4,828,759 A | 5/1989 | Hanulik ....................... 252/628 |
| 4,882,018 A | 11/1989 | Tison ...................... 204/105 R |
| 5,078,842 A | 1/1992 | Wood et al. .................. 204/1.5 |
| 5,306,399 A | 4/1994 | Bradbury et al. ............ 204/1.5 |
| 5,476,641 A | 12/1995 | Todokoro et al. ............... 423/6 |
| 5,482,632 A | 1/1996 | Lomasney et al. .......... 210/638 |
| 5,520,813 A | 5/1996 | Korin et al. ................. 210/638 |
| 5,614,077 A | 3/1997 | Wittle et al. ................. 205/704 |
| 5,724,668 A | 3/1998 | Wood et al. ..................... 588/1 |
| 5,736,023 A | 4/1998 | Gallagher et al. ........... 204/524 |
| 5,805,654 A | 9/1998 | Wood et al. ................. 376/313 |
| 5,894,077 A | 4/1999 | Jones et al. .................. 588/204 |
| 6,147,274 A | 11/2000 | Wood et al. ..................... 588/1 |

FOREIGN PATENT DOCUMENTS

| | | |
|---|---|---|
| GB | 2 077 482 A | 12/1981 |
| JP | 01277013 | 6/1991 |

* cited by examiner

*Primary Examiner*—Arun S. Phasge
(74) *Attorney, Agent, or Firm*—Dergosits & Noah LLP

(57) ABSTRACT

A system for decontamination of radioactive components includes an acidic decontamination solution which is exposed to radioactive components to remove a layer of contaminated material and an ion exchange cell which removes the radioactive contamination from the decontamination solution. The ion exchange cell has cathode, anode and central compartments. The decontamination solution flows into the central compartment and the radioactive cations in the solution are drawn towards the cathode. The acidity in the cathode chamber is controlled so that small radioactive metal particles are deposited on the cathode. A cathode solution flows over the cathode which removes the deposited radioactive particles. The cathode solution and small particles flow into a waste collection container where the metal particles settle to the bottom of the container where they are easily separated from the solution. The only waste product produced by the system are the small radioactive metal particles which are easily disposed of. All liquids used in the decontamination process may be recycled.

20 Claims, 2 Drawing Sheets

ELECTROCHEMICAL PROCESS FOR DECONTAMINATION OF RADIOACTIVE MATERIALS

FIELD OF INVENTION

The present invention is related to the removal of surface radioactive contamination from metallic materials and the collection of the removed contamination in a form suitable for convenient radioactive waste treatment and disposal. More specifically the invention relates to the dissolution of surface contamination with an acid solution, the subsequent conversion of the dissolved ions into metal particles by means of an electrochemical cell and the removal of the metal particles from the decontamination system.

BACKGROUND

Chemical decontamination has become an established method for reducing the radiation exposure of workers at nuclear plants. In this method chemicals are added to a part of the cooling water circuit of the plant and these chemicals dissolve radioactive deposits from the circuit surfaces. The chemicals and the radioactive components are removed from the circulating cooling solution by ion exchange. An example of such a processes is disclosed in U.S. Pat. No. 4,705,573 titled "Descaling Process."

More recently, the same general principle has been applied to the treatment of components which are no longer required for service in nuclear plants. The decontamination of these components not only reduces the worker radiation exposure, but also reduces the radioactive level so that the decontaminated components may be treated as a lower category of radioactive waste. If the decontamination process reduces the radioactivity below a certain level, the components can be regarded as non-radioactive. These processed components may then be reused as components in other nuclear or non-nuclear applications or recycled. This decontamination processing is sometimes referred to as Decontamination for Decommissioning. An example of this kind of process is disclosed in U.S. Pat. No. 6,147,274 titled "Method For Decontamination Of Nuclear Plant Components."

The existing Decontamination for Decommissioning processes expose contaminated metal components to a decontamination solution which removes a layer of material. The radioactive solids and cations are then removed from the decontamination solution. The decontamination for decommissioning processes do not generate liquid radioactive waste because the water used to make up the decontamination solutions is returned to a pure deionized form at the end of the process and can be recycled. The decontamination processes also use dilute solutions and avoid the hazards associated with using concentrated chemicals. The decontamination processes are particularly useful for cleaning components of complex shape (such as tube-in-shell heat exchangers) where mechanical decontamination methods are difficult to apply.

A significant problem with existing Decontamination for Decommissioning processes has been the difficulty of handling the secondary radioactive waste. In some countries radioactive waste burial facilities do not exist and it is necessary to store any secondary waste generated indefinitely on-site. For secondary radioactive waste removal the waste must be transferred to a storage facility where storage container integrity and radiation shielding can be guaranteed. The secondary radioactive waste must also be in a form suitable for transportation and burial. In one such method, the secondary radioactive waste is conditioned as a solid monolith and contained in easily handled drums. In all countries it is imperative to maximize the stability and minimize the volume of secondary radioactive waste produced.

Decontamination for decommissioning processes usually generate ion exchange resins as the final secondary radioactive waste form. All the radioactivity from the decontaminated components and any residual chemicals are collected in this ion exchange resin waste. In the United States radioactive ion exchange resin waste is routinely de-watered and sent for burial in high integrity containers. In other countries regulations prohibit handing radioactive ion exchange resin waste in this manner. The resin waste is also not a convenient waste form because it only holds a fraction of its own weight in the form of radioactive or metallic contamination. Thus, the final radioactive resin waste does not consist of just the contamination removed from the component surfaces, but also the organic polymeric materials which make up the ion exchange resin itself. This inefficiency in the waste processing of resin based decontamination is a significant drawback when compared to mechanical decontamination methods where a thin layer of contaminated material is removed from the component surfaces. The only waste produced by mechanical decontamination methods is the material removed from the component.

U.S. Pat. No. 5,078,842A titled "Process For Removing Radioactive Burden From Spent Nuclear Reactor Decontamination Solutions Using Electrochemical Ion Exchange" discloses a process in which ion exchange resin can be used as an intermediate waste form and is hereby incorporated by reference. The '842 patent discloses a three compartment electrochemical ion exchange cell used to remove radioactive cations from a decontamination solution. A decontamination solution passes through a central compartment of the ion exchange cell containing cation exchange resin. The cation exchange resin removes dissolved contaminants and metal ions from the decontamination solution. The ions held on the resin then migrate under the influence of an electric current into a cathode compartment and reduced to a metallic deposit on a cathode. An anionic equivalent of this process is disclosed in U.S. Pat. No. 5,306,399 titled "Electrochemical Exchange Anions In Decontamination Solutions" and is also hereby incorporated by reference.

Although the method described in the '842 patent was extensively tested, the process has not been applied on a full commercial scale for nuclear reactors. A reason for the lack of use is that the process was designed to be part of operational reactor decontamination, which was the subject of commercial interest in the past. Operational decontamination takes place during the nuclear plant maintenance shut down and must be performed in a very short time. Indeed, maintenance shut-downs have become so short at nuclear plants that there is often insufficient time for the decontamination process using a ion exchange cell to be accommodated, let alone an ancillary decontamination solution treatment system. These time constraints require the electrical migration process to happen very quickly, which in turn required a large input of electric power to the ion exchange cell together with heavy, expensive equipment which was commercially unattractive.

The decontamination process disclosed in the '842 patent is much more suited to decontamination for decommissioning applications, where waste volume reduction is imperative and the time constraints are less onerous. In this case the electrical process can take place at low current with modest equipment over a longer period of time. Of crucial importance, the '842 patent does not address the manner in which the radioactive deposit formed on the cathode should be handled. On a laboratory scale the cell described could then be dismantled and the deposit removed mechanically from the electrode surface. Such a method is not feasible at full scale within proper radiation protection constraints. For the method to be fully commercialized it would be necessary to devise a new method for removing the radioactive deposit on the cathode from the ion exchange cell for disposal.

U.S. Pat. No. 4,828,759 titled "Process For Decontaminating Radioactivity Contaminated Metallic Materials" discloses yet another decontamination process in which an acidic decontamination solution is used to remove radio active materials from components. The contaminants and solid impurities are subsequently removed from the decontamination solution by processing with an ion exchange cell through electrochemical means and deposited on a cathode. Like the '842 patent, the '759 patent does not address the manner in which the radioactive deposits are removed from the cathode or how the radioactive waste is processed for disposal.

SUMMARY OF THE INVENTION

The invention is a system and method for the chemical decontamination of radioactive metallic objects. The inventive decontamination system only produces solid radioactive waste materials in the form of small metal particles and all liquids used in the inventive decontamination system may be recycled. The contaminated metallic objects are exposed to an acid decontamination solution which removes a thin layer of contaminated material. An electrochemical ion exchange is then used to remove radioactive components from the decontamination solution.

The radioactive contamination is then removed from the decontamination solution. After the decontamination solution has absorbed the radioactive materials, the decontamination solution flows through a purification loop. The decontamination loop has an ion exchange cell having a central compartment, an anode compartment and a cathode compartment. This loop may also have a filter which removes solid substances from the decontamination solution released from the components during the decontamination process.

In an embodiment, the ion exchange cell is configured such that the anode and cathode compartments are each separated from the central compartment by ion permeable membranes. The central compartment is filled with cation exchange resin. The decontamination solution flows through the central compartment and the radioactive metal cations in the decontamination solution are captured on by the resin. The trapped radioactive metal cations then migrate under the influence of electric current into the cathode compartment where they are deposited in the form of small metal particles on a cathode. The purified decontamination solution flows out of the central compartment and may be recycled for additional component decontamination.

In an alternative embodiment, the ion exchange cell described above is not filled with a cation exchange resin and the cations in the decontamination solution flowing through the central chamber are not trapped by resin. In this embodiment, radioactive metal cations migrate under the influence of electric current from the decontamination solution through an ion permeable membrane into the cathode compartment. The metal cations then are deposited in the form of small metal particles on a cathode. Not all of the radioactive cations may be removed from the decontamination solution, however a sufficient amount of contamination is removed so that the decontamination solution flowing out of the ion exchange cell can be reused to decontaminate other components.

In both embodiments, a cathode solution flows over the cathode and removes the contaminated metal particles from the cathode. The cathode solution and metal particles flow out of the cathode compartment and into a waste collection container where the metal particles settle out of the solution. After the cathode solutions is free of radioactive contaminants it may be recycled.

In yet another embodiment, the central compartment of the electrochemical ion exchange cell is not filled with cation exchange resin and the cathode compartment is not separated from the central compartment by an ion permeable membrane. The decontamination solution flows from the central compartment into the cathode compartment. In this embodiment the decontamination solution does not flow out of the central compartment. The radioactive metal cations migrate directly to the cathode and are deposited on the cathode as small metal particles. The cathode solution flows over the cathode and removes the deposited metal particles. Both the cathode solution and the decontamination solution flow into the waste collection container. Again the metal particles settle out of the mixed solution. The solution in the waste collection container is recycled as both cathode solution and decontamination solution.

The radioactive metal deposited on the cathode is in the form of small particles rather than an adherent layer by controlling the acidity of the solution in the cathode compartment. In an embodiment, the pH level in the cathode compartment is maintained at about 2.5 to 5.0 which results in small particles being formed on the cathode. These small particles are easily detached from the cathode by a liquid flowing over the cathode and are also large enough to be easily separated from the cathode solution. As discussed, the metal particles settle to the bottom of the waste collection container allowing the solution to be removed from the upper part of the container and recycled.

An object of the present invention is to minimize the quantity of radioactive waste generated by the decontamination process. The metallic contaminants from the components are converted into small metallic particles which are gathered in a waste collection container. By only producing solid metal particle waste the minimum possible waste volume is generated.

The metal particles can then be moved from the waste collection container to another location by hydraulic fluidization, similar to the way radioactive ion exchange resin is conventionally handled. This feature of the invention provides a practical method for removing the radioactive contamination from the apparatus. If a coherent metal deposit were formed on the cathode the only practical way to remove the contamination would be to physically remove the cathode from the apparatus, which would be difficult to achieve in a radiologically safe manner.

The inventive process for removing radioactive metal waste from an electrode is also compatible with other ion exchange cell decontamination processes such as that described in U.S. Pat. No. 6,147,274 as well as other types of dilute acid decontamination processes.

BRIEF DESCRIPTION OF THE DRAWINGS

The invention is herein described, by way of example only, with reference to embodiments of the present invention illustrated in the accompanying drawings, wherein.

DETAILED DESCRIPTION

The present invention is an acid based decontamination system which cleans metallic components which were exposed to radiation in a nuclear reactor. The decontamination system includes a decontamination solution which is used to remove radioactive contamination from the metallic components and a purification loop which removes the radioactive contaminants from the decontamination solution. The contaminated components are exposed to the decontamination solution which dissolves radioactive metal and metal oxides from the surface of a contaminated object. The concentration of acid in the decontamination solution is low, and under normal circumstances the capacity of the decontamination solution to dissolve contaminants would soon be exhausted. However, in the present invention the dissolving capacity of the decontamination solution is continuously regenerated in the purification loop, which recycles the decontamination solution. More specifically, the purification loop includes an ion exchange cell which replaces radioactive metal ions in the decontamination solution with hydrogen ions to before recycling the decontamination solution and a solid contamination removal system which produces only solid radioactive waste.

Figure 1:
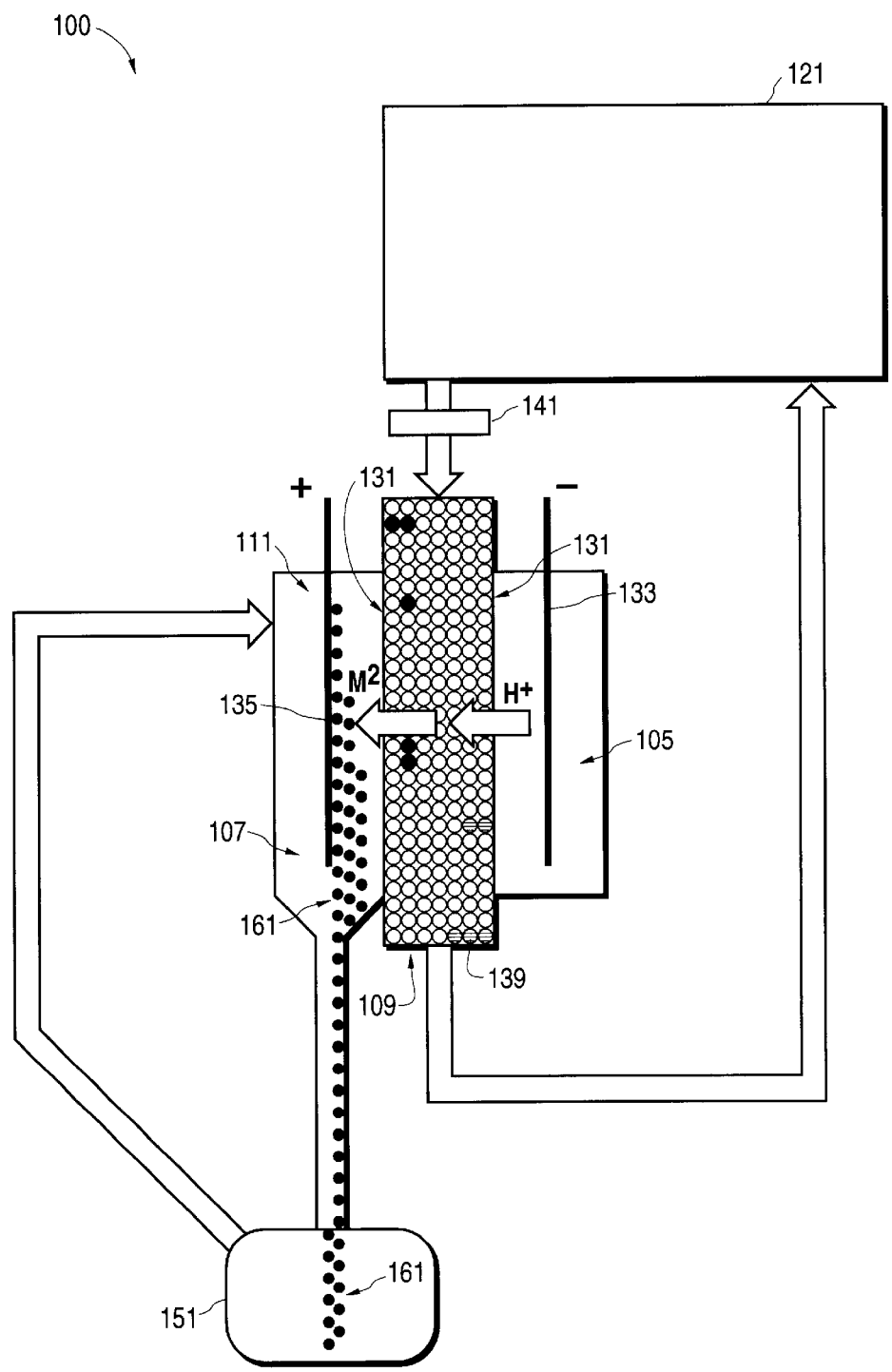
FIG. 1 is a diagram of an embodiment of the decontamination system which utilizes resin in the central compartment of the ion exchange cell.

FIG. 1 illustrates an embodiment of the decontamination system 100 having a decontamination solution holding tank 121 and an ion exchange cell 109. Components may be placed in the holding tank 121 and immersed in the decontamination solution to remove a layer of contaminated material. Alternatively, the decontamination solution may be passed through internal surfaces of the contaminated components or placed in contact with the contaminated components in any other manner. The rate of material removal from the components depends upon various factors including: the chemical composition of the decontamination solution, the duration of contact with the decontamination solution and the temperature of the decontamination solution. The radioactive cations and solid particles contaminants are removed from the decontamination solution in a purification loop.

The purification loop includes an electrochemical ion exchange cell 111 and may also include a filter 141 upstream of the electrochemical ion exchange cell 111 for removing solid particles from the decontamination solution. The decontamination solution liquid flows through the filter 141 and solid particles are trapped by the filter 141. The filter 141 may be periodically cleaned by flowing water through the filter 141 in reverse to remove the radioactive solids. The solid particles removed by the filter can be combined with the metal particles removed from the waste collection container 151 (described in more detail below). The waste from both the filter 141 and the waste collection container 151 can be disposed of in the same manner.

The ion exchange cell 111 includes three compartments, an anode compartment 105, a cathode compartment 107 and a central compartment 109, each separated by cation exchange membranes 131. The anode compartment 105 is filled with an anode solution and contains an anode 133. The cathode compartment 107 contains a cathode 135 and is filled with a cathode solution. The cathode compartment 107 and anode compartment 105 do not directly contact each other but are in ion-communicating relationship with the central compartment 109. Both the anode compartment 105 and the cathode compartment 107 may have recirculation systems which circulate the anode and cathode solutions. The recirculation systems facilitate chemical replacement, cleaning and alteration during processing.

The fundamental principles of operation of the inventive decontamination process are best described with reference to FIG. 1. In a first embodiment, the central compartment 109 is filled with a cation exchange resin 151. The decontamination solution used to clean components is passed through the cation exchange resin 151 in the central compartment 109 of the ion exchange cell 111. The cation exchange resin 151 removes the radioactive contaminants, and metallic impurities from the decontamination solution.

A current is applied across the anode 143 and cathode 141 in the electrochemical ion exchange cell 111. Since the anode compartment 16 contains an acidic solution, the electric current applied to the ion exchange cell 111 electrodes causes hydrogen ions to form at the anode 143. The hydrogen ions are generated by the following reactions:

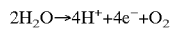
$$2H_2O \rightarrow 4H^+ + 4e^- + O_2$$

or if formic acid is present

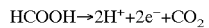
$$HCOOH \rightarrow 2H^+ + 2e^- + CO_2$$

The hydrogen ions then migrate from the anode compartment 105 through the cation membrane 131 into the central compartment 109 under the influence of the electric current 131. In a first embodiment, the central compartment 109 is filled with an ion exchange resin 151. The decontamination solution flows through the central compartment 109 and the metal cations in the solution are captured by the ion exchange resin 151. The hydrogen ions from the anode compartment replace the captured metallic cations present on the cation exchange resin 151. The metallic cations liberated from the resin 151 then migrate from the central compartment 109, through the cation-permeable membrane 131 and into the cathode compartment 107.

The metal cations are drawn towards the cathode 141 and deposited as small metal particles 161 on the cathode 141 as described in the chemical reaction below.

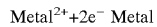
$$Metal^{2+} + 2e^- \; Metal$$

A cathode solution in the cathode compartment 107 flows over the cathode 141 and separates the deposited metal particles 161 from the cathode 141. The cathode solution and separated metal particles 161 flow out of the cathode compartment 107 and into a waste collection container 151. The metal waste particles 161 are denser than the cathode solution and settle to the bottom of the waste collection container 151. The cathode solution in the waste collection container 151 is free of metal particles 151 and may be recycled by pumping the cathode solution back into the cathode compartment.

The settled metal waste particles can be transferred out of the waste collection container 151 by suspension in flowing water or any other suitable means of removal and transportation. After the waste material is transported, the liquid used to transport the solid metal waste is separated and may be reused. The only product of the inventive decontamination system is small contaminated metal particles having a minimal volume which simplifies disposal.

In an alternative embodiment, the central compartment 109 does not include an ion exchange resin 151 and the decontamination solution flows directly through the central compartment 109. In this embodiment, the metal cations are drawn out of the decontamination solution through the cation-permeable membrane 131 and into the cathode compartment 107. In this embodiment, it may be desirable to control the flow rate of the decontamination solution through the central compartment 109. The flow rate of the decontamination solution may be slowed by placing flow restrictors in the flow path through the central compartment 109. The flow restrictors may be mechanical devices such as cross members in the central container 109 which divert the flow paths of the decontamination solution or a flow restrictor in the outlet of the central compartment 109.

Figure 2:
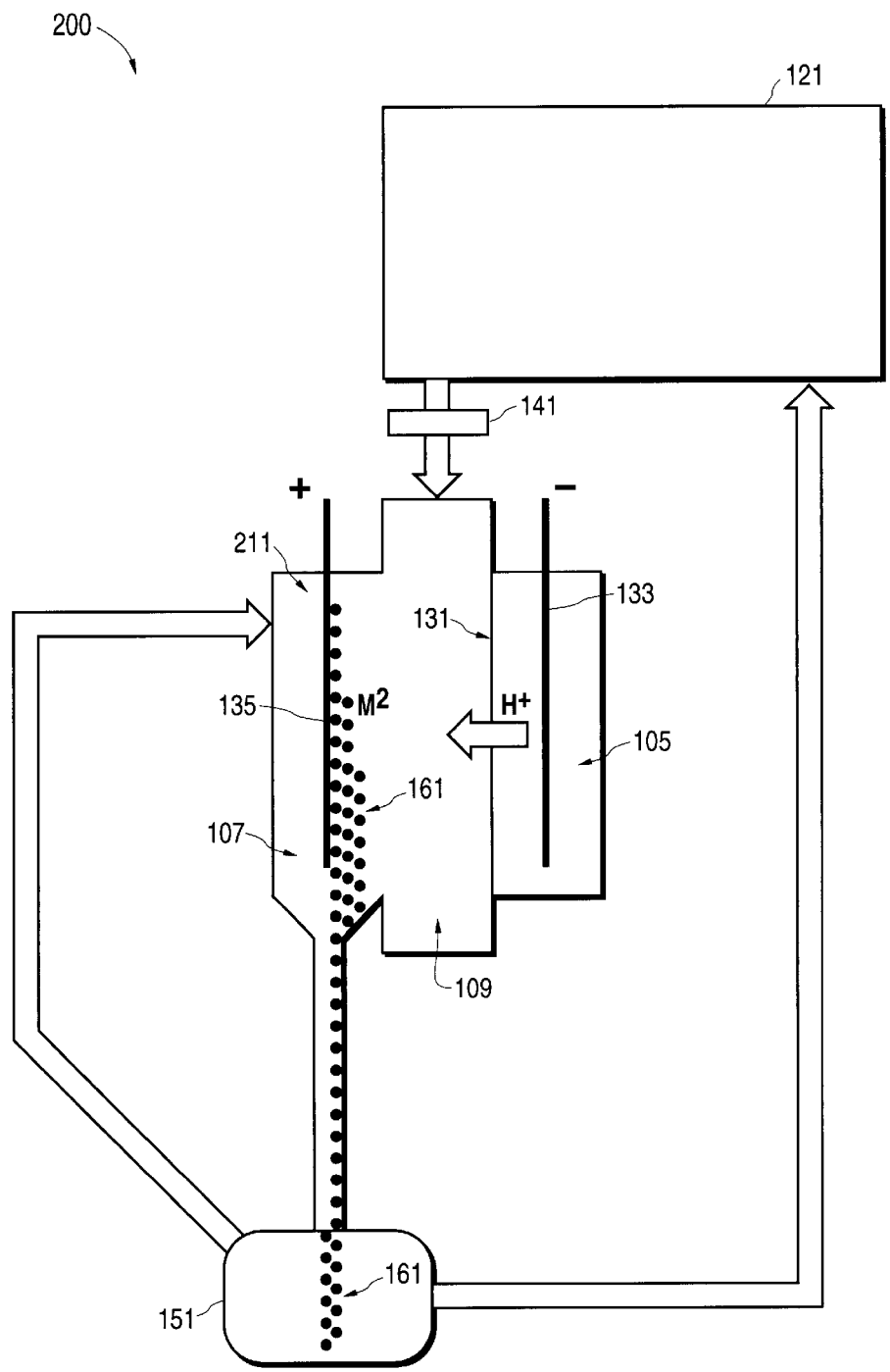
FIG. 2 is a diagram of an embodiment of the decontamination system in which resin is not used in the central compartment of the ion exchange cell and the central compartment is not separated from the cathode compartment by an ion permeable membrane.

FIG. 2 illustrates an alternative embodiment of the decontamination system 200 which also utilizes an ion exchange cell 211 to remove radioactive metal cations from the decontamination solution. In this embodiment, the ion exchange cell 211 has three compartments: a cathode compartment 107, an anode compartment 105 and a central compartment 109. An ion permeable membrane 131 separates the anode compartment 105 and the central compartment 109. An ion permeable membrane does not separate the central compartment 109 from the cathode compartment 107 and the decontamination solution freely flows from the central compartment 109 to the cathode compartment 107. In this embodiment, the central compartment 109 of the electrochemical ion exchange cell 211 is not filled with cation exchange resin and the bottom of the central compartment 109 does not have an outlet. Thus, the decontamination solution flowing into the central compartment 109 must exit through the outlet of the cathode compartment 107.

The operation of this alternative embodiment is described with reference to FIG. 2. The decontamination solution used to clean components flows into the central chamber 109 of the ion exchange cell 211 and then into the cathode compartment 107 where it is combined with the cathode solution. A voltage is applied across the cathode 141 and anode 143 and the radioactive metal cations in the decontamination solution are attracted to the cathode 141 and deposited as small metal particles on the cathode 141 in the chemical reaction described above. Both the decontamination and cathode solutions flow over the cathode 141 and remove the small deposited metal particles. The solutions and particles flow out of the cathode chamber 107 into the waste collection container 151 where the small metal particles settle to the bottom of the waste collection container 151. The solutions in the waste collection container 151 may be recycled and pumped back into the cathode compartment 107 and decontamination solution holding tank 121.

As discussed, the solution in the cathode compartment 107 must have specific chemical characteristics which cause the cations to be deposited on the cathode 141 as small metal particles 161. The deposited metal must be of an appropriate particle size (eg. 100 microns diameter) so that the metal can be easily removed from the cathode 141 and separated from the cathode 135 (and decontamination) solution in a waste settling tank 151. The particle size must not so small that the material remains suspended in the liquid and does not settle to the bottom of the waste settling tank 151. In the preferred embodiment, the deposited metal particles 161 are about 100 microns in diameter.

It has been found that small (100 micron diameter) metal particles are deposited on the cathode 135 when the solution in the cathode compartment 107 has an initial pH of about 2.5–5.0. Uniformly sized metal waste particles 161 of about 100 microns in diameter are easily removed from the cathode 135 and easily separated from the cathode (decontamination) solution. If the pH level is too low, radioactive metal may be plated onto the cathode 135 as a unitary layer. In order to remove the unitary layer, the cathode 135 must be completely removed from the ion exchange cell 111, 211 in order to remove the deposited metal layer from the cathode 135. Alternatively, if the pH level is too low there may not be any deposition on the cathode 135 at all. In contrast, if the pH level is too high, the radioactive particles 161 deposited on the cathode 135 may be too small to be easily separated from the cathode solution. Particles 161 that are too small they will remain suspended in the surrounding liquid and will not settle in the waste collection container 151. Although these small particles 161 may be filtered from the solution, this additional component adds unnecessary complexity to the decontamination system. The specified pH level is not necessarily the only condition which enables proper particle formation, however it is an example of a condition which produces satisfactory results.

More specific descriptions of the chemicals used in the ion exchange cell 111 are described below. Both the anode solution and the cathode solution contain electrolytes. In a preferred embodiment, the electrolyte used in both the anode compartment 105 and the cathode compartment 107 are formic acid, sodium formate or their mixtures. Both the electrolyte solutions in the anode compartment 105 and the cathode compartment 107 are recirculated through reservoirs by liquid pumps (not shown). The waste collection container 151 may be the cathode solution reservoir. The anode solution reservoir is not shown in FIG. 1 or FIG. 2, but is well known in art. The decontamination solution which flows through the central compartment 109 is also an electrolyte.

The acid used in the decontamination solution may be any mineral or organic acid. Examples of mineral acids are: nitric acid, fluoroboric acid, sulfuric acid and hydrochloric acid. The choice of acid will depend on a number of factors, such as effectiveness in dissolving the contamination, solubility of the contaminants in the relevant acid, material compatibility (hydrochloric acid should ideally not be used with stainless steel systems for example) and downstream processing compatibility. In applications where the component materials are particularly sensitive to corrosion, an organic acid can be used. Because organic acids are general weak acids the pH of the solution will be higher than that of the mineral acid based decontamination solutions described above. Examples of organic acids are: formic acid, citric acid, oxalic acid and ethylene diamine tetraacetic acid.

The acid concentration of the decontamination solution is not exclusively bound to be within any specific limits. However, the most preferable range of acid concentration in the decontamination solution is in the range between $10^{-3}$ and $10^{-2}$ M. In this range the acid is sufficiently concentrated to allow the radioactive contamination to be dissolved in a short period of time, but is sufficiently diluted to allow the processes in the purification loop to work in an effective manner.

The decontamination process can be used at any temperature at which water is in the liquid state. The temperature of the decontamination solution is one of the parameters which controls the reaction rate at which the radioactive metal and metal oxide contamination is dissolved. This rate should be equivalent to the rate at which the purification loop removes the metal ions from the decontamination solution. In the preferred embodiment, the decontamination process is conducted at ambient temperature, so that heating or cooling is not required. Although it is desirable to keep the system as simple as possible, the decontamination solution may be inherently heated by the electrical energy used by the electrochemical ion exchange cell. As discussed, a voltage is applied across the anode and cathode which drives the electrochemical ionic reaction. The energy input into the ion exchange cell causes the temperature of the anode and cathode solutions rise during decontamination solution purification processing. Accordingly, the decontamination solution is also heated as it passes through the ion exchange cell. In order to keep the decontamination solution within an optimum temperature range, it may be necessary to cool the recirculating the anode and cathode solutions. It has been found that the optimum cell efficiency occurs when the temperatures of the cathode and anode solutions are close to the boiling point of water, 100° C.

In the preferred embodiment the electrochemical ion exchange cell has specific characteristics. The cation permeable membranes 131 allow ions to travel between adjacent compartments but prevents the liquids in each compartment from mixing. The ion transport characteristics and durability of the membrane materials are important characteristics to consider when choosing a cation-permeable membrane 131. The selection of the cation permeable membrane 131 is within the skill of the ordinary artisan. Representative materials include commercially available BDH cation exchange membranes and Nafion membranes.

In a preferred embodiment, the anode 133 is constructed from, or coated with a precious metal. Platinum or other commonly available industrial anodes such as platinum or ruthenium dioxide coated on titanium are particularly preferred. The cathode 135 is preferably constructed from an inexpensive conductive metal such as stainless steel. The surface of the cathode 135 should also be very smooth to improve the removal of deposited metal particles.

The selection of the specific cation exchange resin 151 to be used in the central compartment 109 is also within the skill of the ordinary artisan. The cation exchange resin 151 selection process is guided by factors which include: the composition of the waste stream to be treated, the binding capacity of the resin, the cost of the resin and the ability of the resin to release its captured cations to enable substitution by hydrogen ions. In a particularly preferred embodiment, the cation exchange resin 151 is Anberlyte 120(H) which is already commonly used in decontamination processes of this type. Another strong acid cation resin which are suitable for this application is Amberlyte 120(H).

If there are minor anionic impurities present in the system which need to be removed, this can be accomplished by placing an anion exchange column (in the same ionic form as the acid being used for the decontamination) in the purification loop. If it is desired to discontinue the use of the decontamination fluid, this can be accomplished by passing the solution through an anion exchange resin in the hydroxide form. This converts the acid solution in the decontamination system to deionized quality water. Upgrading of the water quality can optionally be achieved by use of a mixed bed ion exchange column.

Many decontamination processes which use dilute acids also use so-called "pre-oxidation steps". These pre-oxidation steps typically involve oxidation of chromium species with permanganate ions. Ion exchange through a purification loop does not normally take place during the operation of pre-oxidation steps. In an embodiment, the described pre-oxidation steps can be used in conjunction with the present invention, although the purification loop should not be in use during the application of pre-oxidation steps.

The effectiveness of the inventive decontamination system based upon experimental results of two embodiments is described below:

EXAMPLE 1

Electrochemical ion exchange of decontamination solution using an ion exchange cell with ion exchange membranes separating both the cathode and anode compartments from the central compartment and cation exchange resin in the central compartment.

The results for Example 1 were obtained using the electrochemical ion exchange cell shown in FIG. 1. The cathode was a stainless steel plate and the anode was ruthenium oxide coated titanium. Cation membranes were Nafion 324 (manufactured by Dupont) with working areas measuring 9×4.5 cm. The central compartment was filled with 80 ml cation exchange resin in the hydrogen form. The anode compartment solution was 0.1 N formic acid. The cathode solution was 10 mM fluoroboric acid adjusted to pH 3 with sodium hydroxide. A simulant solution was prepared, equivalent to the dissolution of stainless steel in 10 mM fluoroboric acid. This solution contained iron (255 ppm), chromium (71 ppm) and nickel (45 ppm) in 10 mM fluoroboric acid and was flowed through the central compartment of the cell at a flow rate of 2,000 ml per hour. A total volume of 20 liters of solution was passed through. The voltage applied to the cell was 27 volts, and the current passed was approximately 1.2 amps.

Small metal particles were deposited on the cathode, removed from the cathode and collected external to the cell. Table 1 lists the mass balance of the experiment. "Metals in" refers to the total amount of metals ions in the solution passing through the central part of the cell. "Metals out" refers to the metal ions in the solution after passage through the central compartment of the cell. "Metals recovered" refers to the metals recovered in the form of metal particulate deposit external to the cell. The current efficiency for deposition of metals was about 56%.

TABLE 1

|  | Iron | Chromium | Nickel |
| --- | --- | --- | --- |
| Total metals in | 5,100 mg | 1,410 mg | 894 mg |
| Total metals out | 753 mg | 147 mg | 225 mg |
| Metals recovered | 4,347 mg | 1,263 mg | 669 mg |

EXAMPLE 2

Electrochemical Ion Exchange of Decontamination solution using an ion exchange cell with a single ion exchange membrane between the central and anode compartments and no cation exchange resin in the central compartment.

The results of Example 2 were obtained using an ion exchange cell illustrated in FIG. 2 where the membrane dividing the cathode and central compartments removed and the central compartment was not filled with any ion exchange resin. The cathode compartment was filled with the same solution as that flowing through the central compartment. The same solution was used for flowing into the cell as in example 1. The same flow rate of 2,000 ml per hour was used, and a total of 1.5 liters was passed through. The anode compartment was filled with 0.1M fluoroboric acid. The voltage applied to the cell was 5.6 volts and the current passed was approximately 1.2 amps. Metal was deposited at the cathode and was collected external to the cell. Table 2 represents the mass balance of the experiment of Example 2. The current efficiency for deposition of metals was about 19%.

TABLE 2

|  | Iron | Chromium | Nickel |
|---|---|---|---|
| Total metals in | 389 mg | 113 mg | 71 mg |
| Total metals out | 267 mg | 69 mg | 45 mg |
| Metals recovered | 122 mg | 44 mg | 26 mg |

In the foregoing, a decontamination system has been described. Although the present invention has been described with reference to specific exemplary embodiments of the decontamination system, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A process for removing radioactive cations from a decontamination solution comprising the steps:

exposing contaminated materials to the decontamination solution;

passing the decontamination solution containing radioactive cations through a central compartment of a electrochemical ion exchange cell which is separated from an anode compartment having an anode by a first ion exchange membrane;

recycling the decontamination solution for reuse in the exposing step;

applying a voltage across the cathode and anode;

attracting the radioactive cations to the cathode;

depositing the radioactive cation on the cathode as radioactive metal particles; and flowing a cathode solution over the cathode to detach the radioactive metal particles.

2. The removing process of claim 1 further comprising the step:

capturing the radioactive cations in a cation exchange resin in the central compartment.

3. The removing process of claim 1 further comprising the step:

separating radioactive metal particles from the cathode solution in a settling tank; and recirculating the cathode solution to the cathode compartment.

4. The removing process of claim 3 further comprising the step:

fluidizing the radioactive metal particles for removal from the settling tank.

5. The removing process of claim 1 wherein the metal particles attached to the cathode in the attracting step are a size suitable for hydraulic transport.

6. The removing process of claim 1 further comprising the step:

flowing decontamination solution out of the central compartment before performing the recycling step;

wherein the ion exchange cell includes a second ion exchange membrane which separates the central compartment from the cathode compartment.

7. The removing process of claim 1 further comprising the step:

flowing the decontamination solution out of the cathode compartment before performing the recycling step.

8. The removing process of claim 1 wherein the decontamination solution is an acid of concentration less than 50 millimoles per liter.

9. The removing process of claim 8 wherein the acid is flouoroboric acid.

10. An system for removing radioactive cations from a decontamination solution, comprising:

an electrochemical ion exchange cell which has a central compartment, an anode compartment having an anode, a cathode compartment having a cathode, a first ion exchange membrane separating the central compartment from the anode compartment;

a voltage source for applying a voltage across the cathode and anode;

a waste collection container;

a cathode solution which flows from the cathode compartment to the waste collection container to move the radioactive metal particles from the cathode to the waste collection container;

wherein the radioactive cations and the decontamination solution flow into the central compartment and the radioactive cations are deposited on the cathode as radioactive metal particles, the radioactive metal particles are removed from the cathode and collected in the waste collection container.

11. The system of claim 10, further comprising:

a cation exchange resin material in the central compartment of the electrochemical ion exchange cell.

12. The system of claim 10, wherein the cation exchange resin has a sulphonic acid group in the hydrogen form.

13. The system of claim 10, further comprising:

a filter for removing radioactive metal particles from the decontamination solution.

14. The system of claim 13, wherein the filter is cleaned by flowing water through the filter in a reversed direction.

15. The system of claim 10, wherein materials removed from the filter during cleaning are radioactive metal particles.

16. The system of claim 10, wherein the decontamination solution is an acid of concentration less than 50 millimoles per liter.

17. An apparatus for removing radioactive cations from a decontamination solution comprising:

an electrochemical ion exchange cell which has a central compartment containing the decontamination solution, an anode compartment, a cathode compartment containing a cathode solution, a voltage source having a negative lead connected to a cathode mounted in the cathode compartment and a positive lead connected to an anode mounted in the anode compartment, and an ion exchange membrane separating the central compartment from the anode compartment;

a waste collection container connected to the cathode compartment by a fluid connection which allows the cathode solution to flow from the cathode compartment to the waste collection container;

wherein the decontamination solution with the radioactive cations flow into the central compartment of the electrochemical ion exchange cell and the radioactive cations travel to the cathode compartment, radioactive cations are deposited on the cathode as radioactive metal particles and the radioactive metal particles are removed from the cathode and travel to the waste collection container.

18. The apparatus of claim 17, wherein the decontamination solution is an acid of concentration less than 50 millimoles per liter.

19. The apparatus of claim 17, further comprising:

a filter for removing radioactive particles from the decontamination solution.

20. The apparatus of claim 17, further comprising:

a cation exchange resin in the central compartment of the electrochemical ion exchange cell.

* * * * *